United States Patent
Bessel

(10) Patent No.: US 6,275,252 B1
(45) Date of Patent: *Aug. 14, 2001

(54) METHOD AND APPARATUS FOR IMPROVING VIDEO CONFERENCING VIDEO CAPTURE BY DISTANCE ADAPTIVE FILTERING

(75) Inventor: David H. Bessel, Poway, CA (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/824,197

(22) Filed: Mar. 25, 1997

(51) Int. Cl.⁷ .............................. H04N 7/14; G03B 13/00
(52) U.S. Cl. ................................. 348/14.12; 348/14.05; 348/347
(58) Field of Search ............................ 379/93.17, 100.16; 348/14–17, 240–241, 345–347, 354–361, 208, 335, 350–351; 358/402–403; 382/255–256; 396/52, 55, 79, 96

(56) References Cited

U.S. PATENT DOCUMENTS

| | | | |
|---|---|---|---|
| 5,253,286 | * 10/1993 | Sano et al. | 379/93.17 |
| 5,424,776 | * 6/1995 | Hirasawa | 348/345 |
| 5,486,860 | * 1/1996 | Shiokawa et al. | 348/347 |
| 5,598,209 | * 1/1997 | Cortjens et al. | 348/211 |
| 5,614,951 | * 3/1997 | Lee et al. | 348/355 |
| 5,623,309 | * 4/1997 | Yoshimura et al. | 348/355 |
| 5,680,484 | * 10/1997 | Ohyama et al. | 382/255 |
| 5,724,155 | * 3/1998 | Saito | 358/402 |
| 5,838,368 | * 11/1998 | Masunaga et al. | 348/211 |
| 5,874,994 | * 2/1999 | Xie et al. | 345/355 |

FOREIGN PATENT DOCUMENTS

2312459 * 12/1996 (JP) ............................... H04N/5/262

* cited by examiner

Primary Examiner—Wing F. Chan
Assistant Examiner—George Eng
(74) Attorney, Agent, or Firm—Blakely, Sokoloff, Taylor & Zafman LLP

(57) ABSTRACT

A zoom distance of a camera is determined at a time when a video image is captured. Next, a filtering process is applied to the image based upon the zoom distance. For one embodiment, the process of determining the zoom distance includes establishing a reference focal length of a lens system of the camera and comparing that reference focal length to a measured focal length of the lens system at a time when the video image is captured. Based upon whether the reference focal length is greater than or less than the measured focal length, a filtering process is applied to the image. The filtering process to be applied is such that when the reference focal length is greater than the measured focal length, the filtering process removes more high frequency components from the image than are removed when the measured focal length is greater than the referenced focal length. That is, when the image is recognized as being that corresponding to a wide angle shot, and hence a lower focal length for the lens system, fewer high frequency components are removed from the image during filtering.

11 Claims, 8 Drawing Sheets

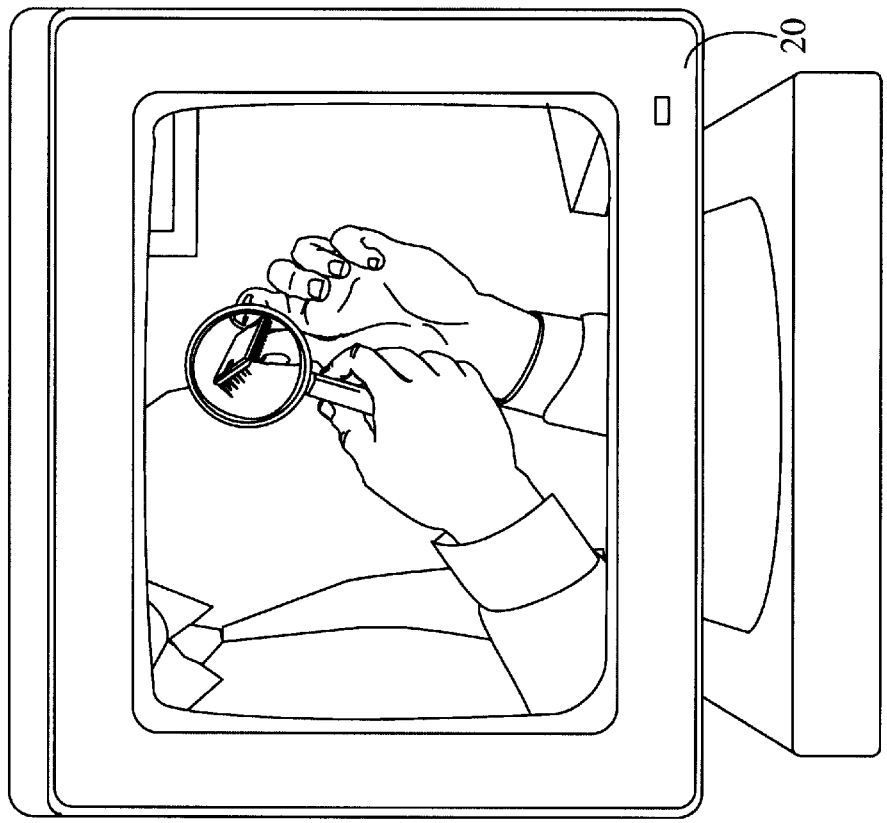
Fig. 3A
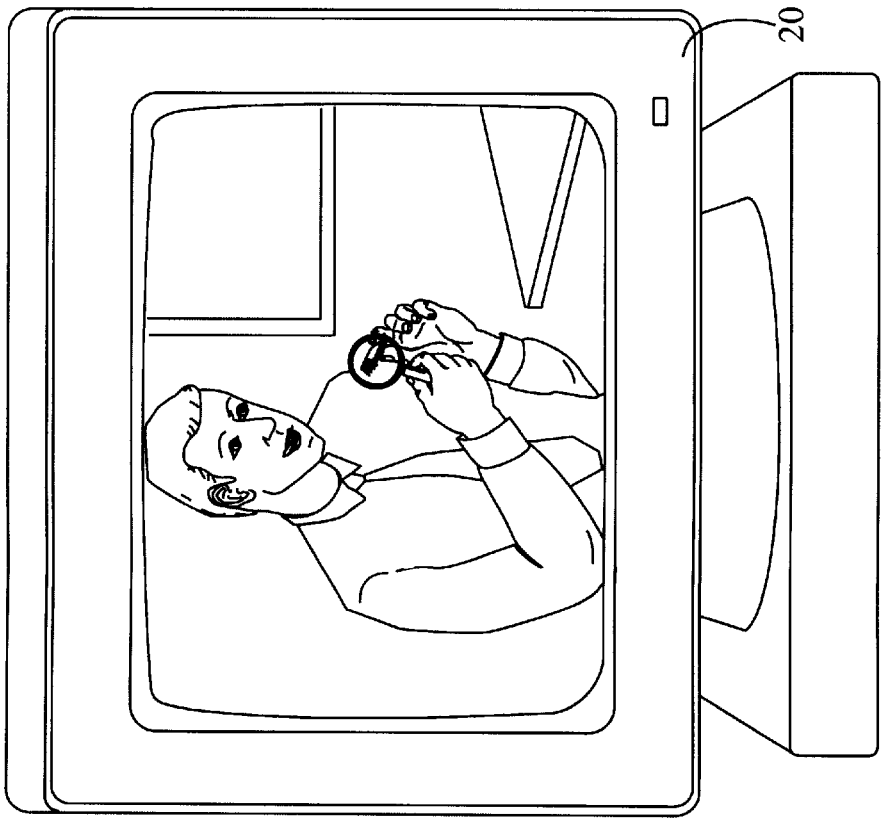
Fig. 3B
Fig. 3

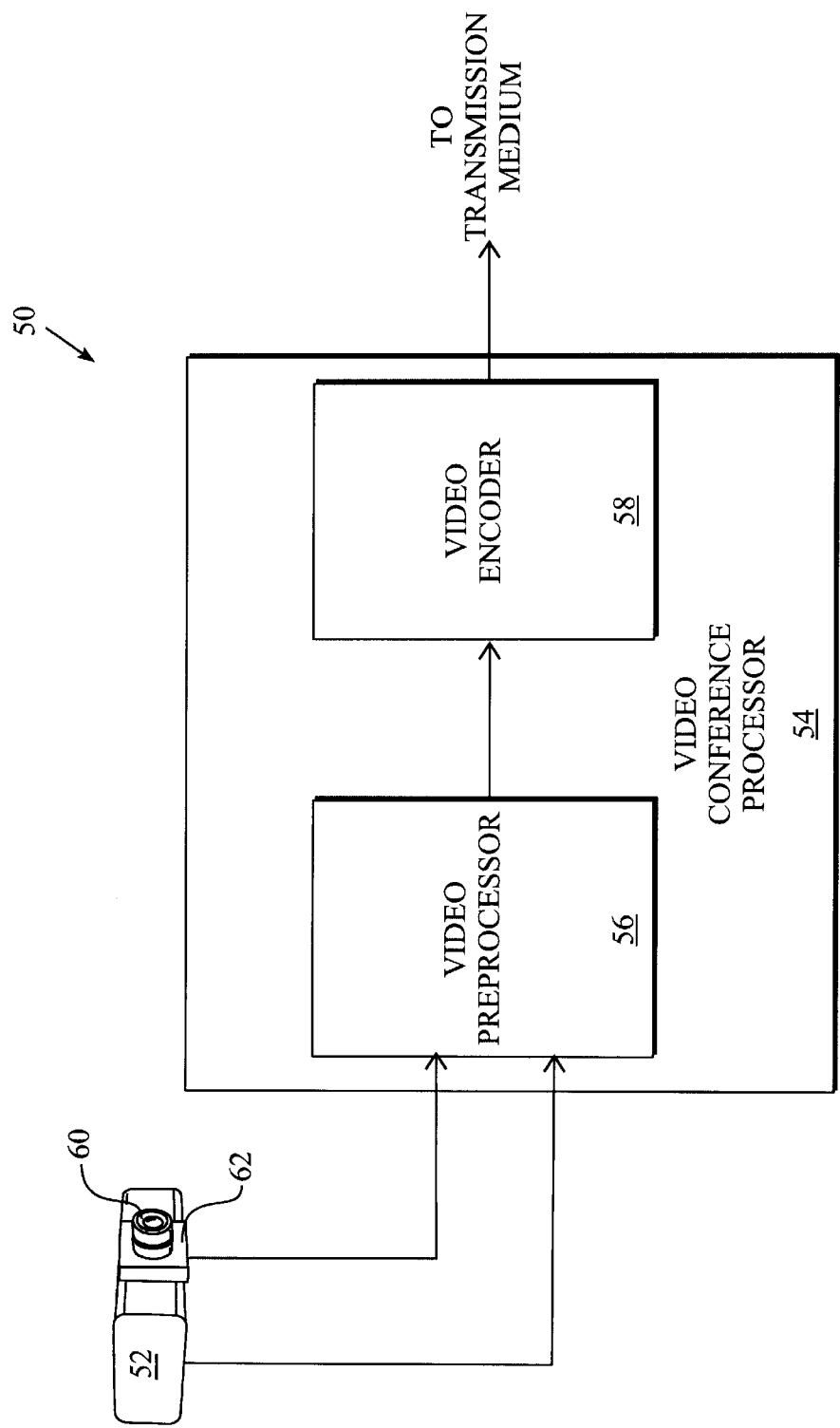

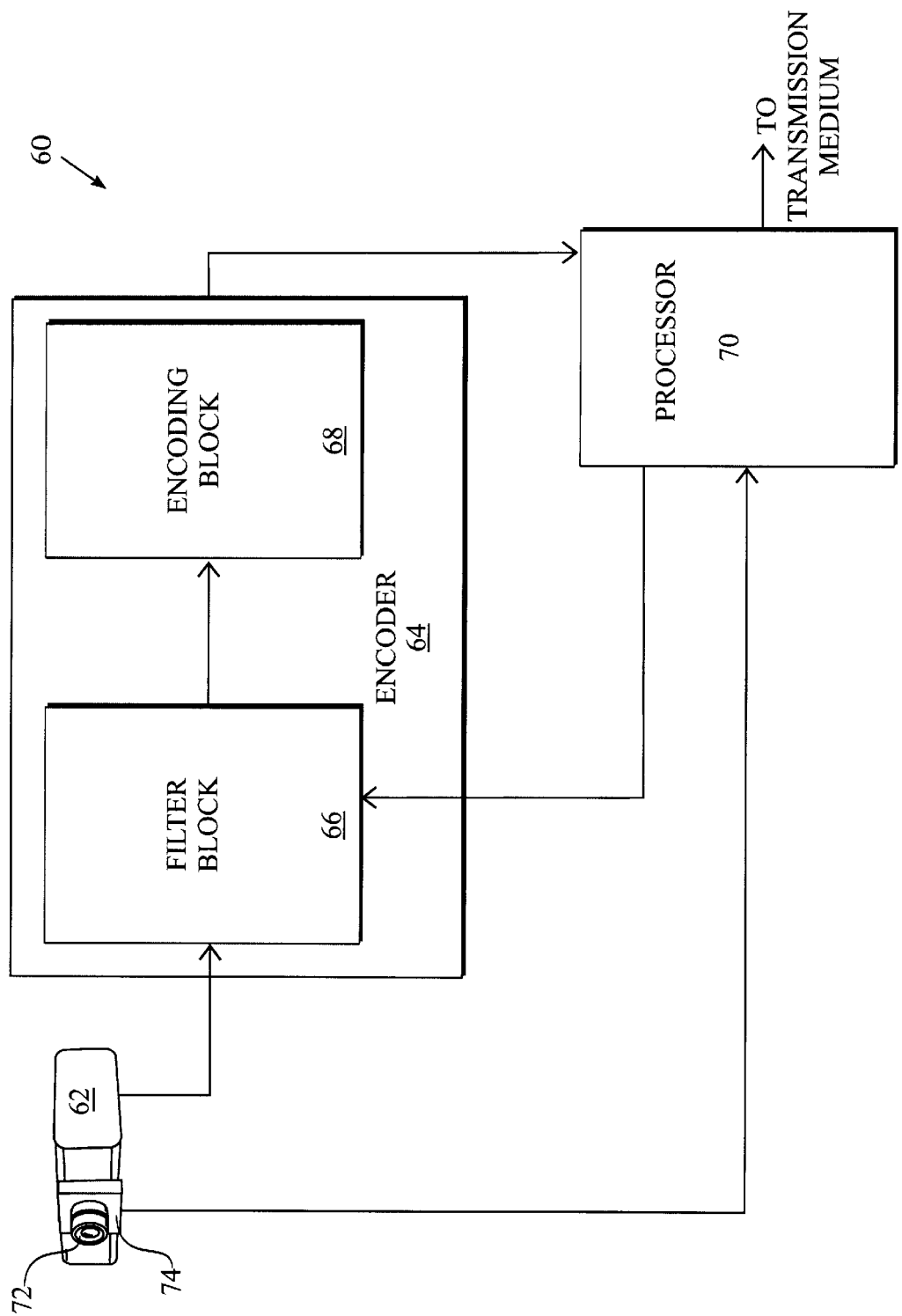

METHOD AND APPARATUS FOR IMPROVING VIDEO CONFERENCING VIDEO CAPTURE BY DISTANCE ADAPTIVE FILTERING

FIELD OF THE INVENTION

The present invention is related generally to video conferencing systems and, more particularly, to video imaging preprocessing based upon the degree of zoom of a camera lens within such a system.

BACKGROUND

The use of video conferencing systems as a means of conducting meetings, presentations and other matters continues to gain in popularity. Video conferencing systems generally allow users separated geographically to both see and hear one another. A typical video conferencing system is illustrated in FIG. 1.

Video conferencing system 10 generally includes a local station 12 and a remote station 14. Each of the local and remote stations 12 and 14 includes a video conference processor 16, a camera 18, a monitor 20, a microphone 22 and a speaker 24. Certain of these elements may be combined within a single unit. For example, the housing for monitor 20 may also include the video conference processor 16 as well as the microphone 22 and speaker 24. In such systems, camera 18 may be a separate, stand-alone device or may also be incorporated within the housing of monitor 20. In other embodiments, each of the elements may be stand-alone devices.

Local station 12 and remote station 14 are connected by a transmission medium 26. In some cases, transmission medium 26 may be the Public Switched Telephone Network (PSTN) or, in other cases, transmission medium 26 may be an ISDN line or other transmission medium.

In general, during the video conference, video images captured by camera 18 at local station 12 are filtered and encoded by video conference processor 16 prior to transmission to remote station 14. Similarly, audio signals captured by microphone 22 are filtered and encoded by video conference processor 16 prior to transmission. At remote station 14, video and audio data received from local station 12 are expanded and processed prior to display on monitor 20 and speaker 24. Likewise, video and audio signals captured by camera 18 and microphone 22 at remote station 14 are encoded by video conference processor 16 prior to transmission to local station 12. At local station 12, this video and audio data are expanded prior to display on monitor 20 and speaker 24.

FIG. 2 further illustrates the encoding process performed by video conference processor 16 at local and remote stations 12 and 14. Video signals from camera 18 are passed to video processor 28. Video processor 28 performs filtering operations on the video images, for example, to remove high frequency components such as noise produced by camera 18. Filtered images are passed from video processor 28 to video encoder 30 for compression prior to transmission.

During a video conference, a variety of images may be captured and transmitted by a video conference system. For example, as shown in FIG. 3A, "long shots" in which a relatively wide angle scene is captured as a image may be transmitted between local station 12 and remote station 14 for display. As shown, the resulting image displayed on monitor 20 at remote station 14 may be such that a user at remote station 14 can view a wide angle presentation or group of people, etc. At various times during the video conference, the user may wish to zoom in on aspects of the presenter or the presentation. FIG. 3B illustrates an example where the user has zoomed in on the presenter, for example, during an especially interesting portion of the discussion. To effect this zoom in, the user at remote station 14 transmits zoom commands to the local camera 18 stationed at local station 12. In response, camera 18 zooms in on the presenter at local station 12 so that the resulting image is displayed. At other times during the presentation, the user at remote station 14 may wish to zoom out so that the entire scene is displayed on his monitor 20.

At times when the scene to be captured by camera 18 has a relatively wide angle, certain image details may be unimportant and, hence, need not be transmitted to remote station 14. However, at the same times, motion within the scene, for example gestures by the presenter towards a presentation display, may be important. Accordingly, filtering provided by video processor 28 at local station 12 should be such that accommodates motion within sequential video images but need not be such that a accommodates a great amount of image detail. In contrast, during periods of zoom in, image detail becomes important while motion compensation need not be as important. Thus, at these times video processor 28 should apply filtering to achieve improved image detail.

Typically, video processors such as video processor 28 of video conference processor 16 are incapable of providing different filtering algorithms at different time during a video conference. Accordingly, what is needed is distance adaptive filtering means which achieve optimum performance according to the scene captured by a camera.

SUMMARY OF THE INVENTION

In one embodiment, the present invention provides a method of processing a video image captured by a camera. First, a zoom distance of the camera is determined at a time when the video image is captured. Second, a filtering process is applied to the image based upon the zoom distance. For one embodiment, the process of determining the zoom distance includes establishing a reference focal length of a lens system of the camera and comparing that reference focal length to a measured focal length of the lens system at a time when the video image is captured. Based upon whether the reference focal length is greater than or less than the measured focal length, a filtering process is applied to the image. The filtering process to be applied may be such that when the reference focal length is greater than the measured focal length, the filtering process removes more high frequency components from the image than are removed when the measured focal length is greater than the referenced focal length. That is, when the image is recognized as being that corresponding to a wide angle shot, and hence a lower focal length for the lens system, fewer high frequency components are removed from the image during filtering.

These and other features and advantages of the present invention will be apparent upon review of the specification which follows and the accompanying drawings.

BRIEF DESCRIPTION OF THE DRAWINGS

The features and advantages of the present invention are illustrated by way of example in the accompanying drawings which arc no way intended to limit the scope of the present invention to the particular embodiment shown.

FIGS. 3A and 3B illustrate wide angle and close-up views, respectively, during a video conference.

FIGS. 4A, 4B and 4C illustrate various embodiments of video conferencing systems configured in accordance with the present invention.

DETAILED DESCRIPTION

Figure 1:
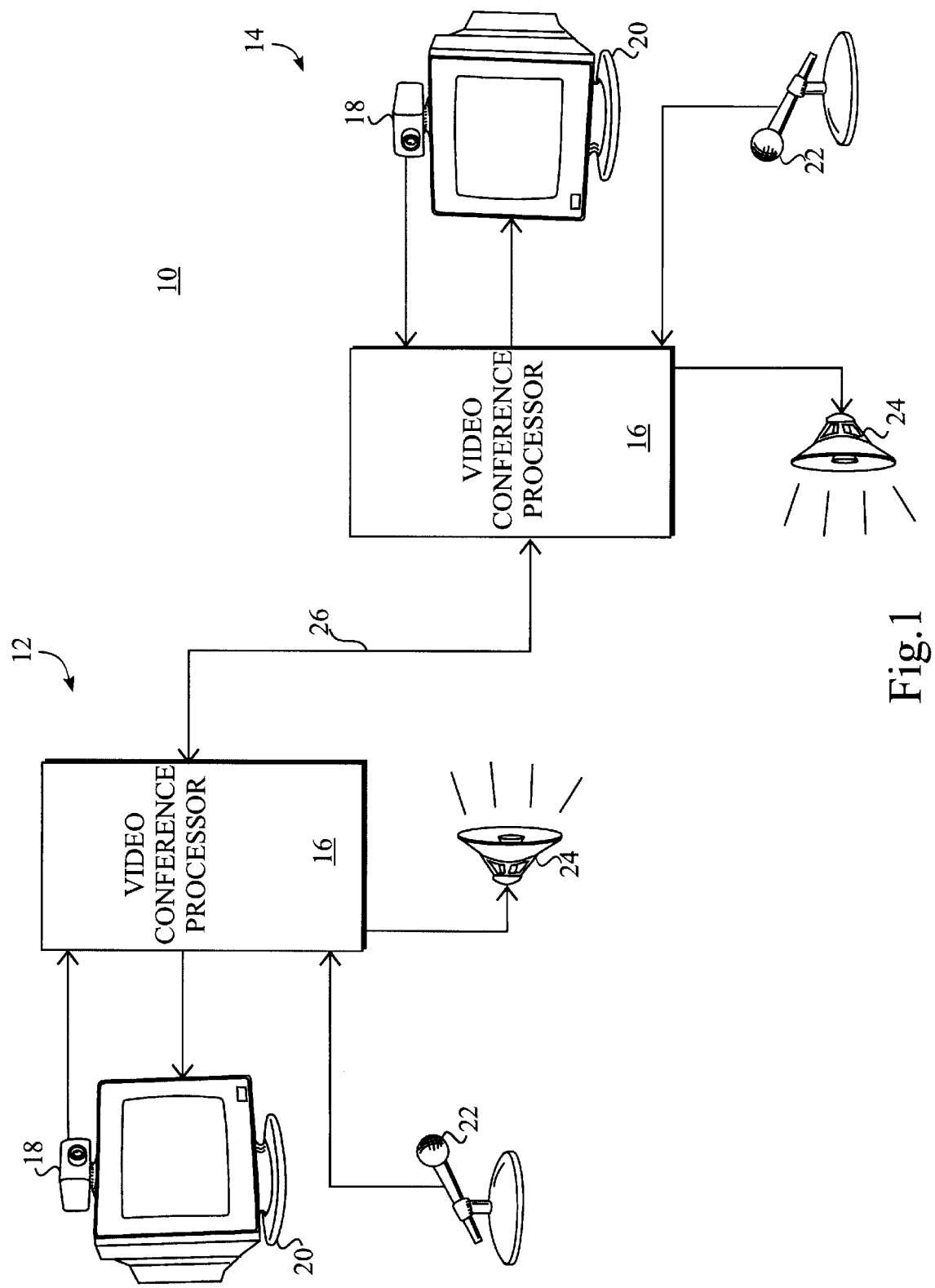
FIG. 1 illustrates a conventional video conferencing system.
Figure 2:
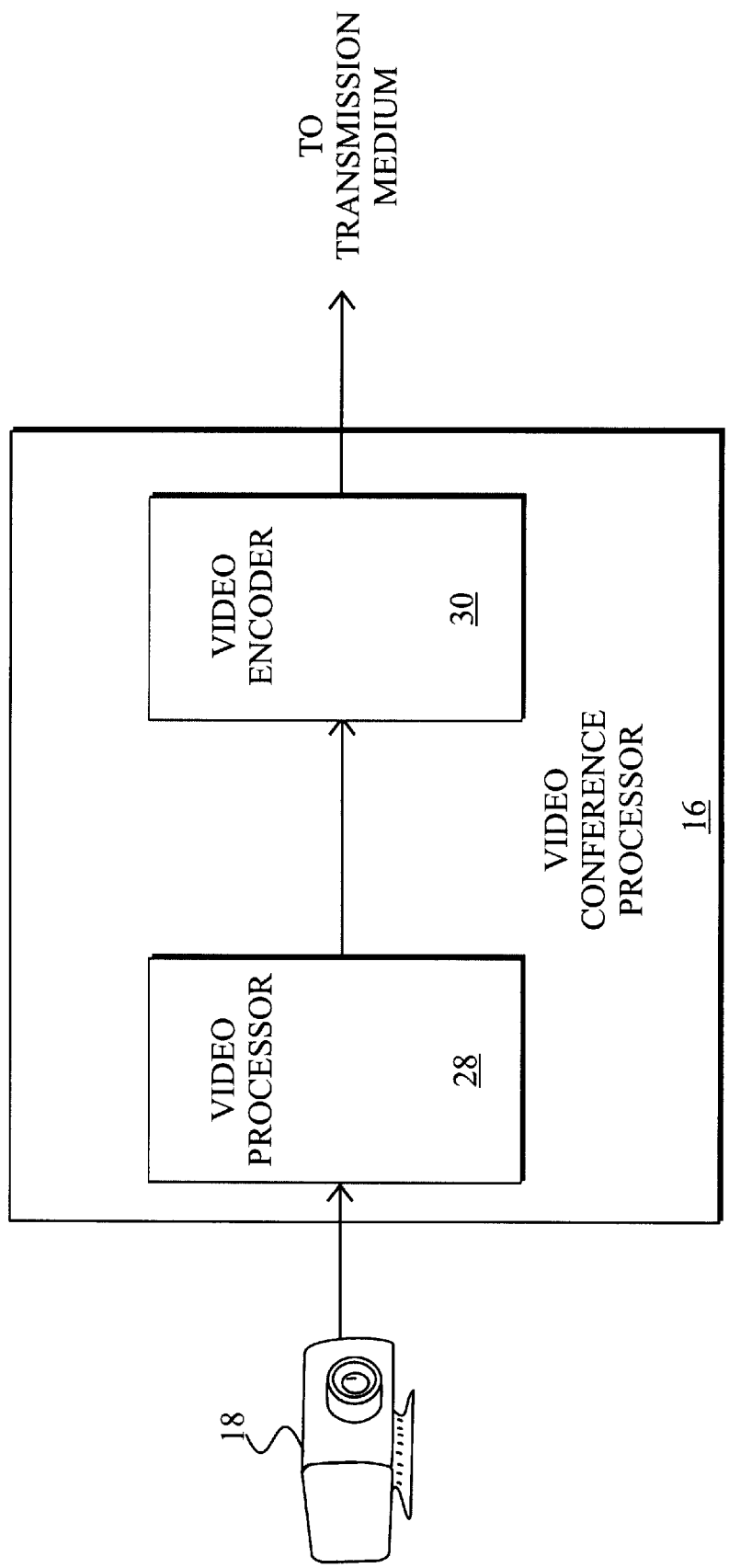
FIG. 2 illustrates a conventional video conferencing processor of the video conference system shown in FIG. 1.

A distance adaptive filtering method and apparatus for improving video conference video capture is described. In general, a video camera fitted with a zoom lens is attached to a video conferencing processor. The video conferencing processor has an associated video preprocessor which modifies input video signals from the video camera to optimize the performance of a video image encoder. Attached to the zoom lens is a lens position measurement device which provides lens position information (i.e., the degree of lens zoom) to the video conferencing processor. When the degree of zoom of the camera lens is changed, this information is transmitted to the video preprocessor that then changes its processing algorithm in accordance with a desired performance level thought appropriate for that degree of camera lens zoom. In other embodiments, the lens position measurement device is eliminated and the degree of camera lens zoom is tracked by the video conferencing processor. Although, described with reference to particular architectures, those skilled in the art will recognize that the present invention is equally applicable for use in wide variety of video conferencing systems. Accordingly, the embodiments described below should be regarded as illustrative only.

FIG. 4A illustrates a video conferencing system 50 configured in accordance with the present invention. Video conference system 50 includes camera 52 and video conference processor 54. Video conference processor 54 includes a video preprocessor 56 and video image encoder 58. Video images transmitted from camera 52 to video conference processor 54 are filtered by video preprocessor 56 to remove undesired image effects and then compressed by video encoder 58 prior to transmission. Camera 52 is fitted with a zoom lens 60. Zoom lens 60 is capable of alternating it's focal length according to zoom commands. The zoom commands may be provided by video conference processor 54 or by a remote video conference station (not illustrated).

Associated with zoom lens 60 is a lens position measurement device 62 which provides lens position information to video conference processor 54 according to the degree of lens zoom of zoom lens 60. The lens position information provided by lens position measurement device 62 is used by video preprocessor 56 to apply an appropriate video filter to the video image data transmitted by camera 52. That is, during times when zoom lens 60 has a relatively long focal length, thus indicating a close-up image is being transmitted by camera 52, video preprocessor 56 will provide filtering appropriate the close-up image (e.g., filtering designed to provide a relatively high degree of detail in the video image). Conversely, at times when zoom lens 60 has a relatively short focal length, indicating a wide angle video image is being transmitted by camera 52, video preprocessor 56 will apply filtering appropriate for a wide angle view (e.g., filtering which allows motion within the video image to be captured).

FIG. 4B illustrates alternative embodiment of a video conferencing system 60 configured accordance with the present invention. Video conference system 60 includes camera 62, encoder 64 and processor 70. Encoder 64 includes a filter block 66 and an encoding block 68. Video images transmitted by camera 62 are filtered in filter block 66 prior to being compressed in encoding block 68. The compressed images are then passed to processor 70 for transmission.

Camera 62 is fitted with a zoom lens 72. Associated with zoom lens 72 is lens position measurement device 74 which provides lens position information to processor 70. Processor 70 is configured to provide filter instructions to filter block 66 according to the lens position information from lens position measurement device 74. When lens position measurement device 74 indicates that lens 72 has a relatively short focal length (i.e., a wide angle shot), processor 70 will instruct filter block 66 to apply an appropriate filter to insure video image performance level appropriate for a wide angle shot. Conversely, when lens position measurement device 74 indicates that zoom lens 72 has a relatively long focal length, processor 70 will instruct filter block 66 to apply a video filter to the images from camera 62 to ensure a performance level thought appropriate for a close-up shot. The filtered video images are then passed to encoding block 68 for compression prior to transmission.

Those skilled in the art will recognize that filter block 66 may be configured to provide a number of different filters to images from camera 62. Where digital filters are used, the filter parameters may be stored in a look-up table (e.g., in an associated memory device) for recall according to the filter instructions provided by processor 70. Other embodiments will utilize only two filters, one of which may be selected at a time. Of course, several filters may be combined to achieve optimum performance of video conference system 60 depending on the image being captured by camera 62.

Figure 4C:
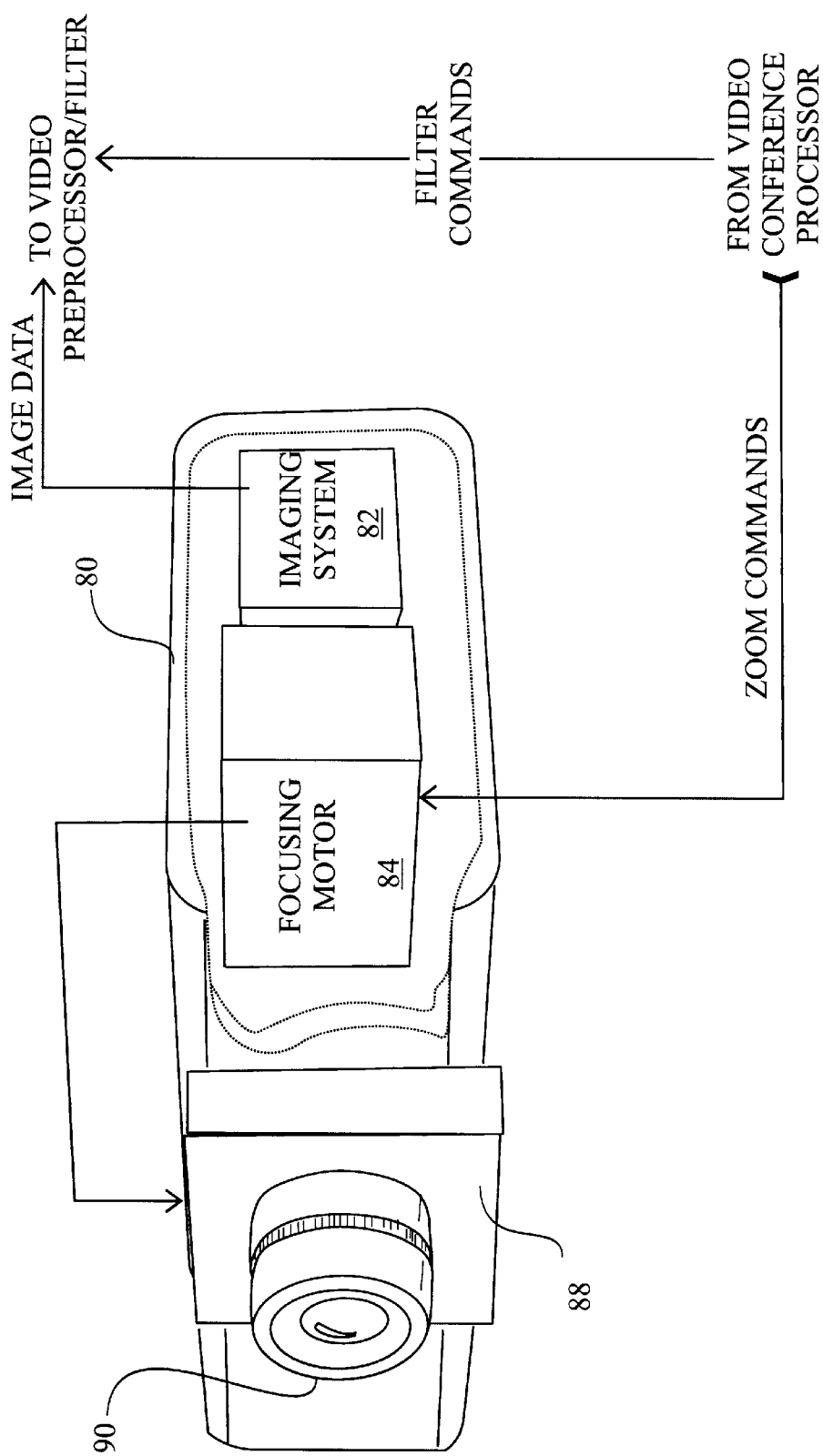

FIG. 4C illustrates yet a further embodiment of a video conferencing system configured in accordance with the present invention. Camera 80 includes an imaging system 82, a focusing motor 84, a focusing and lens mounting system 88 and a lens system 90. Video images captured by imaging system 82 through lens system 90 are transmitted as image data to a video preprocessor/filter as discussed above. Zoom commands are received by focusing motor 84 from the video conference processor associated either with a local or remote station. The zoom commands cause focusing motor 84 to adjust the focal length of lens system 90 using focus and mounting system 88. It will be appreciated that the focus and mounting system 88 may be one of several focus and mounting system for camera lenses as are known by those skilled in the art.

In this system, the video conference processor keeps track of the zoom commands transmitted to focusing motor 84. Based upon these zoom commands, filter commands are provided from the video conference processor to the video preprocessor/filter. The filter commands instruct the video preprocessor to apply video filtering appropriate for the degree of zoom to be applied to lens system 90.

Figure 5:
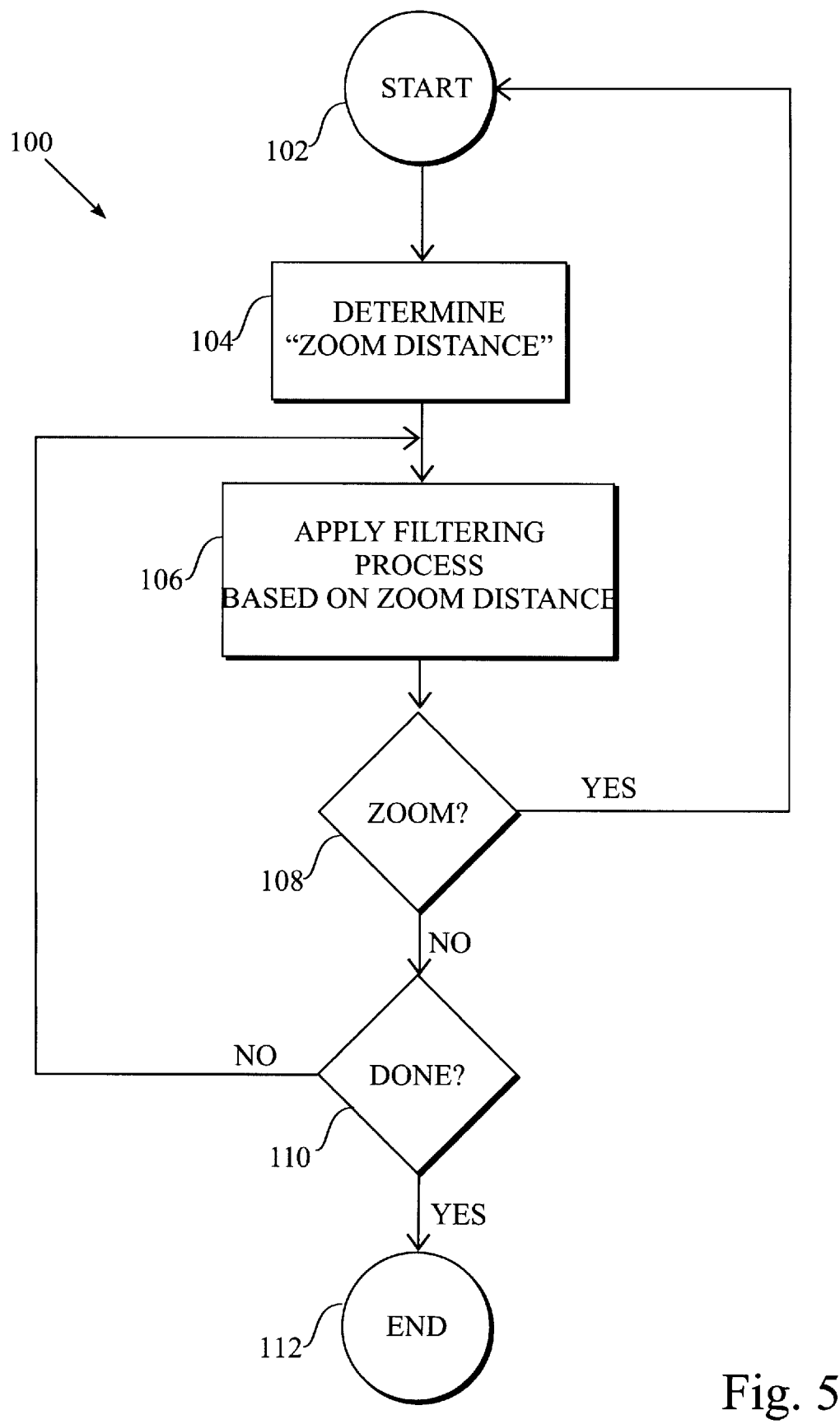
FIG. 5 is a flow diagram illustrating a distance adaptive filtering method for use according to the present invention.

FIG. 5 illustrates a distance adaptive filtering process for use according to the present invention. The process illustrated in FIG. 5 may be applied in any of the abovedescribed embodiments or other similar systems. Distance adaptive filtering process 100 starts when called at step 102. Next, at step 104 a zoom distance is determined. As described above, the zoom distance will correspond with the focal length of a camera lens system. In those cases where a lens position measurement device is used, the zoom distance may be determined from the lens position information provided by the lens position measurement device. Alternatively, for those embodiments (e.g., the embodiment described with reference to FIG. 4C) where the video conference processor keeps track of zoom commands, the zoom distance may be determined by the video conference processor itself.

Once the zoom distance has been determined, process 100 applies a filtering process based on the zoom distance at step 106. The filtering process is generally implemented by a video preprocessor as described above. The filtering process used will depend upon the zoom distance such that when a wide angle shot is recognized, a filtering process appropriate for a wide angle view is implemented. Conversely, when a close-up shot is recognized, a filtering process appropriate for image detail and close-up view is implemented. Other filters may also be applied as discussed above. According to one embodiment, a reference focal length is established and compared with the measured focal length from step 104. If the reference focal length is less than the measured focal length (e.g., a close-up shot), close-up filtering is used. Otherwise, if the reference focal length is greater than the measured focal length, wide angle filtering is used.

Next, at step 108, a test is made to see whether further camera zoom (in or out) has been ordered. If so, the process returns to step 104 to determine the new zoom distance. Otherwise, the process moves to step 110 to determine whether the video conference has been completed. If not, the current filtering process is applied for the next video image. This process continues until the video conference ends at step 112.

Figure 6B:
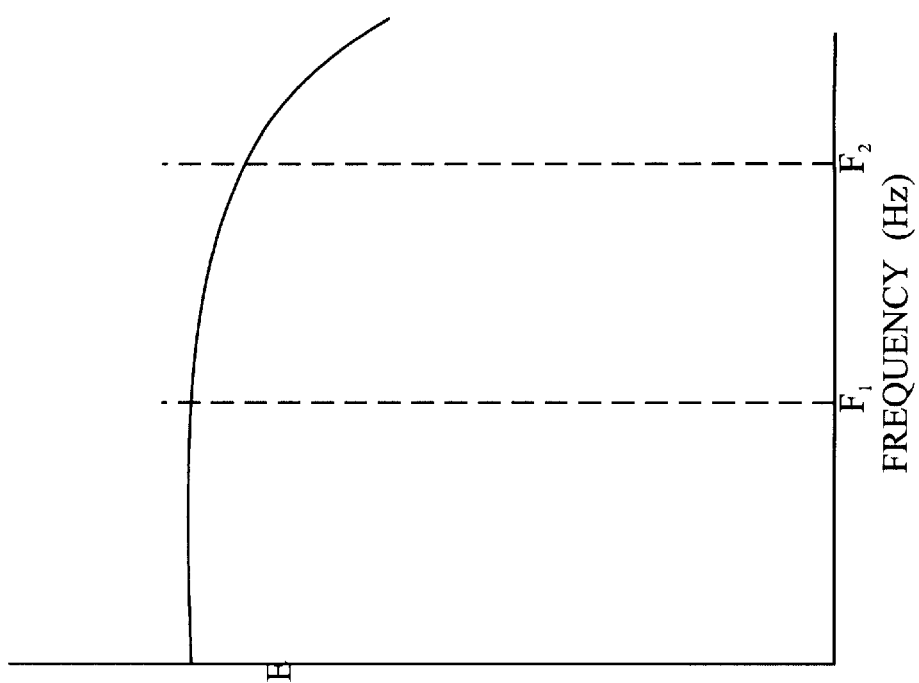
FIGS. 6A and 6B illustrate frequency responses of video image filters which may be utilized in accordance with the present invention.
Figure 6A:
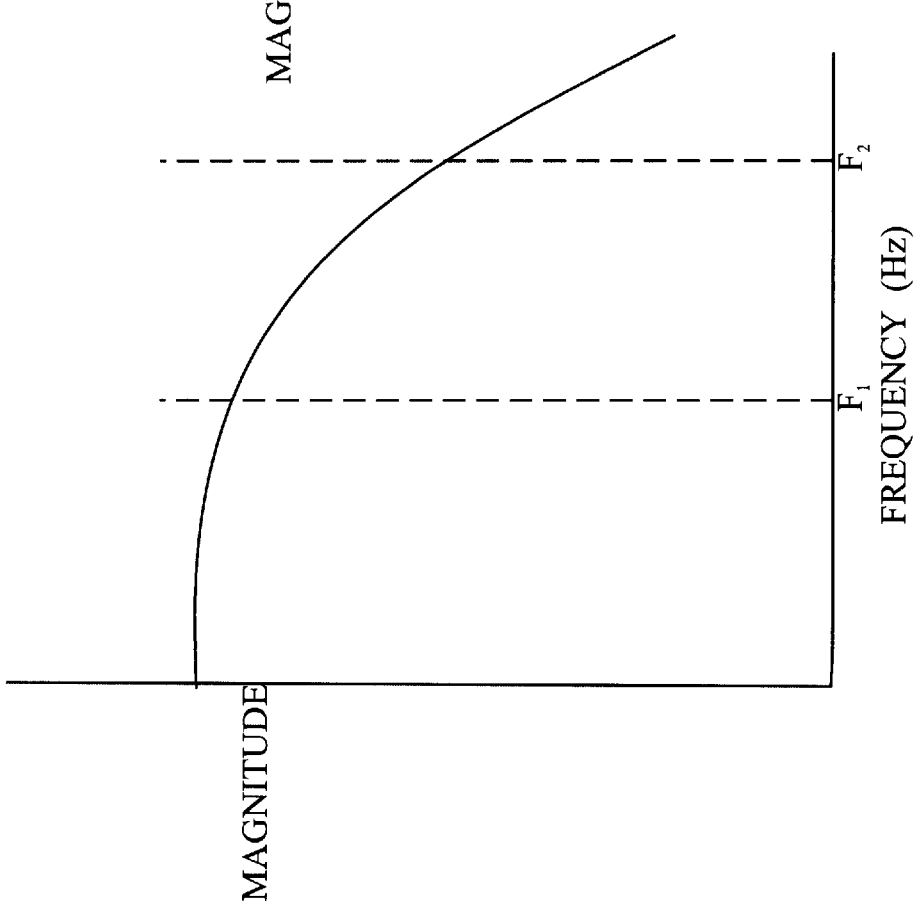

FIGS. 6A and 6B illustrate frequency responses of various spatial filters which may be applied by a video preprocessor according to lens position information. The filter having the frequency response shown in FIG. 6A is a low pass filter with a cut-off frequency of F1. Such a filter may be appropriate for wide angle shots where fewer high frequency components of a video image are required.

Then, as lens position information which indicates a close-up image is provided, a video preprocessor may adapt in accordance with the present invention to employ a filter having a frequency response similar to that shown in FIG. 6B. The filter having a frequency response similar to that shown in FIG. 6B has a cut-off frequency of F2, higher than F1. This indicates that more high frequency components of the video image are passed by the filter, as may be appropriate when further image detail is required during a close-up.

Of course other spatial and temporal filters as are commonly used in the video conferencing arts may be employed by a video preprocessor and adapted based upon camera lens position information in accordance with the present invention. Accordingly, although the present invention has been described with reference to certain specific illustrated embodiments, the present invention should not be limited thereby. Instead, the present invention should be measured only by the claims which follow.

What is claimed is:

1. A video conference system, comprising:
   a camera having a lens system with a variable zoom position and configured to provide an indication of said zoom position;
   a video processor configured to receive an image from said camera and said indication of said zoom position and to digitally filter said image using filter coefficients retrieved from a look-up table according to said indication of said zoom position to produce a filtered image; and
   a processor configured to transmit said filtered image to a receiving unit across a transmission medium.

2. A video conference system as in claim 1 wherein said camera is further configured to provide an indication of said zoom position by establishing a reference focal length of said lens system, comparing a measured focal length of said lens system at said time when said image is captured to said reference focal length and deciding whether said reference focal length is greater than said measured focal length, wherein when said reference focal length is greater than said measured focal length said video processor is configured to apply a first filtering process to said image, and otherwise to apply a second filtering process to said image.

3. A video conference system as in claim 2 wherein said first filtering process removes more high frequency components from said image when said measured focal length of said lens system is less than said reference focal length than are removed by said second filtering process when said measured focal length of said lens system is greater than said reference focal length.

4. A video conference system as in claim 1 wherein said video processor is further configured to compress said image prior to transmission across said transmission medium.

5. A video conference system, comprising first and second video conference stations communicatively coupled through a transmission medium and each video conference station having a camera fitted with a zoom lens and an associated video processor, wherein said associated video processor is configured to digitally filter images received from said associated camera according to an indication of zoom position of said associated camera to produce filtered images and transmit said filtered images to the other video conference station across the transmission medium.

6. The video conference system of claim 5 wherein the video processors are configured to digitally filter the images using filter coefficients retrieved from a look-up table.

7. The video conference system of claim 5 wherein the filtered images are compressed prior to transmission.

8. A method of filtering image in a video conference system, comprising the steps of receiving images from a camera, receiving an indication of a zoom position at the time when said images are captured from said camera, digitally filtering said images received from said camera according to said indication of zoom position of said camera to produce filtered images, and transmitting said filtered image to a receiving unit.

9. The method of claim 8 wherein the digital filtering is performed using filter coefficients retrieved from a look-up table.

10. The method of claim 8 wherein the filtered images are transmitted across a transmission medium.

11. The method of claim 10 wherein the filtered images are compressed prior to transmission.

\* \* \* \* \*